2,832,800

REESTERIFICATION ALCOHOLYSIS

Edward H. Specht, Huntingdon Valley, and Christine E. Smith, Philadelphia, Pa., assignors to Rohm & Haas Company, Philadelphia, Pa., a corporation of Delaware No Drawing. Application January 23, 1956
Serial No. 560,854

2 Claims. (Cl. 260—486)

This invention deals with a process for converting a lower alkyl methacrylate into dimethylaminoethyl methacrylate. It concerns a process wherein a lower methacrylate, particularly methyl methacrylate, is mixed with dimethylaminoethanol within definite proportions, the mixture is heated, alkali metal catalyst is added thereto and addition is continued in small increments in defined proportions within a limiting time while the reaction mixture is heated at active reflux with rapid take-off of the alkanol derived from the starting lower alkyl methacrylate.

Reesterifying of lower alkyl methacrylates with an alcohol other than that used to form the lower alkyl methacrylate has previously been proposed. The usual combination of a higher alkanol and a lower alkyl methacrylate leads without complication to the higher alkyl methacrylate with evolution of a lower alkanol. The process in its usual form can be successfully performed with substitution for the higher alkanol of an alcohol having substituent groups such as cyano, ether, and, usually, amino. For instance, diethylaminoethanol can satisfactorily be reacted with a lower alkyl methacrylate upon addition of an alkali metal or its alcoholate.

When, however, dimethylaminoethanol and a lower alkyl methacrylate are reacted after addition of the alkali metal catalyst, the reaction starts but often soon ceases. If more catalyst is added at this time, the reesterification reaction may be resumed for a time. Sometimes, even though reesterification is not complete, reaction can no longer be effected. It has been observed that a white precipitate forms and usually there is considerable polymer formation. Yields of dimethylaminoethyl methacrylate tend to be relatively low by methods which have been successfully applied in the past to preparation of other tertiary aminoalkyl methacrylates. A similar situation is shown with respect to acrylates by Rehberg and Faucette in J. Amer. Chem. Soc. 71, 3164 (1949).

When the procedure in which a large excess of methyl methacrylate over dimethylaminoethanol is used together with an added azeotroping solvent, such as benzene, and sodium methoxide in methanol is added dropwise over a period of six hours, actual yields of 40 to 60% of the desired product have been at best obtained. The yield of ester cannot be determined from the amount of alcohol or alcohols taken off.

Our studies of the process have shown that there are a number of competing reactions in addition to the desired alcoholysis reaction. For example, there occurs saponification, this being one source of the white precipitate, which has been found to contain sodium methacrylate. There is a possible reaction of alcohol and methacrylate to form an alkoxyisobutyrate, a reaction which is catalyzed by an alkaline catalyst. Under the influence of the alcoholysis catalyst, a type of polymerization occurs. This is not properly controlled by addition of inhibitors which are conventionally used to guard against free-radical polymerization. Other side reactions can and do take place.

We have discovered, however, that under the conditions which are described below, excellent yields of dimethylaminoethyl methacrylate can be regularly obtained by reesterifying a lower alkyl methacrylate with dimethylaminoethanol. Successful reaction of these two materials requires mixing dimethylaminoethanol and lower alkyl methacrylate, the ratio of methacrylate to dimethylaminoethanol being from about 1.3:1 to 2.5:1, heating the mixture to 80° to about 95° C., then adding about 0.2 to one mole percent of alkali metal catalyst based on the dimethylaminoethanol, taking off lower alkanol in the distillate continuously, adding repeatedly small increments of alkali metal catalyst at a rate of 0.4 to about one mole percent per hour based on the dimethylaminoethanol taken, and recovering dimethylaminoethyl methacrylate from the reaction mixture.

Critical factors for effecting high yields of dimethylaminoethyl methacrylate of high purity are use of an alkyl methacrylate as the sweeping liquid to aid in removal of alcohol formed, heating the reaction mixture to a reacting temperature before catalyst is added, adding an effective but limited amount of catalyst at this time, maintaining at least a minimum level of catalyst by frequent addition, and taking off lower alkanol about as rapidly as it is formed. The minimum level for promoting reaction varies somewhat with the particular catalyst used, but it is in general about 0.05 mole percent based on the dimethylaminoethanol.

The most convenient catalytic material to add is sodium methoxide. This is readily prepared by dissolving sodium in methanol. Fresh, commercial sodium methoxide can also be used, but one should avoid a sodium methoxide which has been exposed to the atmosphere for some time. It is probable that the sodium from the methoxide is transferred to the amino alcohol and the principal active substance in the mixture is sodium dimethylaminoethoxide. This compound has been prepared and found to be quite as useful as the methoxide. In place of sodium, there have been used with good yields resulting lithium and potassium methoxides and dimethylaminoethoxides. Other alkali metal alkoxides, such as sodium ethoxide or potassium butoxide, are likewise effective.

The optimum rates of addition of catalyst depend upon the rate at which the desired reaction can be advanced with removal of the lower alkanol split out. If conditions favor rapid removal of this alkanol, a relatively more rapid rate of addition of catalyst can be used, while slower rates of take-off of alkanol require a slower rate of addition of catalyst. Where equipment provides good fractionation and permits a favorable reflux ratio, such as 3:1 to 8:1, as the alkanol is removed, reaction can be completed within an hour for a given batch. Rates of addition of catalyst and conditions of operations must be adjusted, however, to permit essential completion of reaction within five hours, if favorable yields are to be attained.

In place of methyl methacrylate, there can be used ethyl methacrylate or a propyl methacrylate, but without advantage. Butyl methacrylate can also be used as a starting material, but with the disadvantage that at temperatures required to distill off butanol at normal pressures, there occurs noticeable formation of polymer. While temperatures can be lowered by working at decreased pressures, this requires an additional operation which is not necessary with the other lower alkyl methacrylates, which are, therefore, preferred.

While the reaction is best started at about 90° C., the temperatures after the start of the reaction usually change. The overhead temperature will be that of the distilling azeotrope of alkanol and alkyl methacrylate, for example, about 65°–70° C. for the methanol-methyl methacrylate azeotrope or 80°–85° C. for the ethanol-ethyl methacrylate azeotrope. The pot temperature will vary with the materials used, but should never exceed about 140° C. and is best kept below 130° C. Reduced pressure can be used to ensure that these upper limits are not exceeded when the apparatus lacks the most efficient arrangement for separating alkanol.

Conventional inhibitors for controlling and limiting polymerization of the methacrylates may desirably be used, even though these do not prevent anionic polymerization. The mixture of reactants may be formed and kept under an inert atmosphere, such as nitrogen.

When reaction has been essentially completed, as may be indicated by no more alkanol being formed, the reaction mixture is worked up to isolate the desired dimethylaminoethyl methacrylate. If desired, the reaction mixture may be filtered to separate any solids present followed by distillation. Separation is not, however, essential and better yields can usually be obtained by distillation of the entire reaction mixture.

Further details of the method of preparing dimethylaminoethyl methacrylate according to this invention are presented in the following illustrative examples. Parts shown are by weight unless otherwise identified.

Dimethylaminoethyl methacrylate has many known uses. It provides useful polymers and copolymers for use in castings, coatings, films, and fibers. It may be applied as a monomer to improve the properties of natural and synthetic fibers.

*Example 1*

The following materials were charged to a flask and heated to 90° C.: 600 parts of methyl methacrylate, 289 parts of dimethylaminoethanol and 6 parts of p-rydroxydiphenylamine. There was then added 5 parts of a catalyst solution, made by dissolving 2.0 parts of sodium metal in dry methanol and the final volume made up to 40 parts. After the initial addition of catalyst solution, subsequent additions of 1 part each were made at 5-minute intervals. A moderate boil-up rate was used and the methanol-methyl methacrylate binary azeotrope was removed at a reflux ratio of 7:1 through a packed column containing the equivalent of 10–12 theoretical plates. The reaction was complete in three hours; by the end of this period essentially no distillate could be obtained with the head temperature below 70° C. Separate, consecutive fractions (about 30 parts each) taken at half-hour intervals during the reaction period had the following methanol contents, as estimated by refractive index: 81.5, 83.7, 83.1, 72.5 and 53.3%. The value reported in the literature for the azeotrope is 85% methanol.

Distillation of the reaction mixture gave 434 parts of dimethylaminoethyl methacrylate, corresponding to a yield of 85%, based on dimethylaminoethanol, it boiled at 71° C. at 11 mm. and had a refractive index of 1.4396 at 20° C.

*Example 2*

A catalyst solution was made up by dissolving 1.0 part of sodium in dry methanol and adjusting the final volume of solution to 20 parts. The following materials were combined and heated to 90° C.: 289 parts (3.25 moles) of dimethylaminoethanol, 600 parts (6.0 moles) of methyl methacrylate, and 6 parts of p-hydroxydiphenylamine. Catalyst solution was then added as follows: 5 parts of solution initially, followed by 1-part portions at 5-minute intervals. The methanol-methyl methacrylate binary azeotrope was removed as rapidly as possible by distillation through a packed column. When the temperature in the still head could no longer be held below 70° C., addition of catalyst was discontinued; of the above described catalyst solution only 17 parts were used. Reaction time (after heating to 90° C.) to the point where methanol was no longer formed was 66 minutes. The distillate obtained during the reaction weighed 178 parts and contained 65% of methanol (estimated by refractive index). After correction for the amount of alcohol introduced with the catalyst, the amount of alcohol in the distillate corresponded to 96% of the calculated quantity for the reaction.

The reaction mixture was distilled without further treatment to obtain 430 parts (84.4% of theory) of dimethylaminoethyl methacrylate, boiling at 70° C. under a pressure of 10 mm. of mercury.

*Example 3*

Sodium metal (2 parts) was dissolved in 267 parts (3.0 moles) of anhydrous dimethylaminoethanol. A charge of 600 parts (6.0 moles) of methyl methacrylate and 6 parts of p-hydroxydiphenylamine was heated to 90° C. and about 50 parts of a solution of sodium dimethylaminoethoxide in dimethylaminoethanol was added. Ten minutes later addition of the remaining solution of the sodium alcoholate was started at a rate of approximately 1.5 parts per minute. The azeotropic binary of methanol-methyl methacrylate was removed through a good column at such a rate and reflux ratio that the distillation temperature at the head of the column did not rise above 70° C. A total of 161 parts of distillate was obtained in a period of 150 minutes. The distillate contained 93 parts of methanol, corresponding to about 97% of the calculated quantity for the reaction.

The reaction mixture was filtered to remove precipitated sodium methacrylate and distilled to obtain 384 parts (81.5% of theory) of dimethylaminoethyl methacrylate, boiling at 74° C. under a pressure of 12 mm. of mercury.

*Example 4*

A charge of 267 parts of dimethylaminoethanol and 684 parts of ethyl methacrylate, containing 7 parts of p-hydroxydiphenylamine as polymerization inhibitor, was heated to 90° C. About one-third of a solution of 2 parts of sodium metal in 33 parts of anhydrous ethanol was added. The remainder of the catalyst solution was added in increments at 5-minute intervals over a period of 120 minutes. With a rapid boil-up rate the azeotropic binary, ethanol-ethyl methacrylate, was removed through a packed column containing about twelve theoretical plates. The distilling head was equipped with a thermoregulator and electrically controlled take-off so that distillate could be removed at a 3:1 reflux ratio as long as the temperature stayed below about 83° C. When the temperature tended to rise above 83° C. the distilling head automatically adjusted to total reflux until sufficient azeotrope had accumulated to lower the head temperature to below 83° C.

A total of 202 parts of distillate was obtained in a distillation time of 130 minutes. The reaction mixture was distilled without further treatment to obtain 399 parts of dimethylaminoethyl methacrylate. The yield, based on dimethylaminoethanol was 84.7%.

*Example 5*

A charge consisting of 400 parts (4.0 moles of methyl methacrylate), 267 parts (3.0 moles) of dimethylaminoethanol, and 6 parts of p-hydroxydiphenylamine was heated with stirring to 90° C. Nine parts of catalyst solution, prepared by dissolving 2 parts of sodium metal in 25 parts of dry methanol, was added initially, the remainder being added at the rate of about 0.1 part per minute. The methanol-methyl methacrylate azeotrope was removed rapidly through an efficient fractionating column, using an automatically controlled head so that distillate was taken only when the head temperature was below 70° C. Catalyst solution had all been added at 180 minutes. The collected distillate amounted to 163 parts and contained 71.5% of methanol. After correction for the amount of methanol introduced with the catalyst, the methanol in the distillate amounted to 95% of that calculated to be released by the reaction. The reaction mixture was fractionally distilled to obtain 403 parts of dimethylaminoethyl methacrylate (85.6 of theory based on dimethylaminoethanol).

*Example 6*

A catalyst solution was prepared as follows. A mixture of 490 parts dimethylaminoethanol, 12 parts of lithium hydroxide, and 500 parts of benzene was refluxed with a water separator until water ceased to be evolved. The benzene and part of the dimethylaminoethanol were removed by distillation, leaving 190 parts of residual solution containing 47.5 parts of lithium dimethylaminoethoxide and 142.5 parts of dimethylaminoethanol. Of this solution 28 parts were used in the following reaction.

A charge containing 267 parts of dimethylaminoethanol, 600 parts of methyl methacrylate and 6 parts of p-hydroxydiphenylamine was heated to 90° C. and 10 parts of the above catalyst solution was added initially. Thereafter, catalyst solution was added in portions of 0.9 part each at five-minute intervals. Using a fractionating column of 10–12 theoretical plates, the azeotrope of methanol and methyl methacrylate was removed essentially as rapidly as methanol was formed in the reaction. A thermoregulator in the distilling head was set to allow take-off only at head temperatures below 70° C. and the reflux control was set to provide a 3:1 reflux ratio during take-off. The final addition of a catalyst solution was made at one hundred minutes and distillation ceased twenty minutes later.

The reaction mixture was fractionally distilled under reduced pressure to obtain 388 parts of dimethylaminoethyl methacrylate. The total amount of dimethylaminoethanol used (charged initially and added with the catalyst solution) was 288 parts. The yield of ester was 76%, based on the dimethylaminoethanol. In contrast to reactions carried out with sodium methoxide as catalyst, no precipitate formed during the reaction period.

In a similar reaction in which potassium dimethylaminoethoxide was used as catalyst, an 85% yield of dimethylaminoethyl methacrylate was obtained with a reaction period of seventy minutes.

*Example 7*

The catalyst solution was prepared by diluting 10 parts of 25% sodium methoxide in methanol with 20.4 parts of methanol. Five parts of this solution was added to a mixture of 267 parts dimethylaminoethanol, 600 parts methyl methacrylate and six parts p-hydroxydiphenylamine, at an initial temperature of 90° C. Thereafter, catalyst solution was added in portions of 0.85 part each at five-minute intervals; this corresponded to a catalyst addition rate of 0.5 mole percent per hour, based on the amount of dimethylaminoethanol in the charge. With a rapid boil-up rate, methanol was removed through an efficient distillation column, in the form of its azeotrope with methyl methacrylate, over a boiling range of 65°–70° C. Catalyst addition was discontinued at the end of two hours and distillation ceased within twenty minutes. A total of 201 parts of distillate was obtained with a methanol content of 60%. With allowance for the methanol added with the catalyst solution, the amount of methanol obtained in the distillate was essentially 100% of that calculated for the reaction.

The reaction mixture was fractionally distilled under reduced pressure. After removal of unreacted methyl methacrylate, 414 parts of dimethylaminoethyl methacrylate was obtained, boiling at 74° C. under a pressure of 14 mm. of mercury; $n_D^{20}$ 1.4395. The yield was 88%, based on dimethylaminoethanol.

*Example 8*

The catalyst solution was prepared by diluting 20 parts of 25% sodium methoxide in methanol with 12.7 parts of methanol. The charge of 267 parts dimethylaminoethanol, 600 parts methyl methacrylate and 6 parts p-hydroxydiphenylamine was heated to 90° C. and 5.5 parts of the catalyst solution was added initially. Thereafter, catalyst solution was added in portions of 0.9 part each at intervals of five minutes; this corresponded to a catalyst addition rate of 1.0 mole percent per hour, based on the dimethylaminoethanol in the charge. Using the same equipment and the same conditions (except for catalyst addition rate) as in previous example, the azeotrope of methanol and methyl methacrylate was removed in the boiling range of 65°–70° C. Distillation became very slow at the end of one hour at which time catalyst addition was discontinued; distillation ceased within ten minutes. The distillate consisted of 157 parts with a methanol content of 71.5%. The amount of methanol in the distillate, with allowance for that added with the catalyst, corresponded to essentially 100% of that calculated for the reaction.

Fractional distillation of the reaction mixture yielded 424 parts of dimethylaminoethyl methacrylate, boiling at 74° C. under a pressure of 14 mm. of mercury, and having a refractive index, $n_D^{20}$ 1.4395. The yield, based on dimethylaminoethanol, was 90%.

The process of this invention is peculiarly efficient. It avoids the vagaries of prior art procedures and is quite reproducible. It provides high quality products which form homopolymers and copolymers reproducibly and dependably. Also, in this process it is not essential, as in the prior art procedures, to dry all reactants. There may thus be used commercial grades of alkyl methacrylates and dimethylaminoethanol even though these contain 0.1–0.2% of water.

We claim:

1. A process for preparing dimethylaminoethyl methacrylate which comprises mixing dimethylaminoethanol and a lower alkyl methacrylate in which the alkyl group contains not over four carbon atoms in a mole ratio from about 1:1.3 to 1:1.5, heating the resulting mixture in the absence of an organic solvent to 80° to 95° C., adding thereto an alkali metal catalyst in the form of its alkoxide to supply from 0.2 to about one mole percent of said metal per mole of dimethylaminoethanol, heating the reaction mixture under reflux with formation of lower alkanol, distilling off an azeotrope of alkyl methacrylate and alkanol as it is formed with the pot temperature not over 140° C., and adding said alkali metal catalyst at a rate from 0.4 to one mole percent per hour based on dimethylaminoethanol taken, as long as alkanol is formed.

2. A process for preparing dimethylaminoethyl methacrylate which comprises mixing dimethylaminoethanol and methyl methacrylate in a mole ratio of about 1:2, heating the resulting mixture in the absence of solvent to about 80°–95° C., adding thereto a solution of sodium methoxide in methanol to supply from 0.2 mole percent to about one mole percent of sodium per mole of dimethylaminoethanol, heating this reaction mixture under reflux with formation of methanol with the pot temperature below 130° C., taking off methanol as rapidly as formed in a binary azeotrope of methanol and methyl methacrylate, and adding sodium methoxide at a rate from 0.4 to one mole percent per hour based on dimethylaminoethanol taken, as long as methanol is being formed.

References Cited in the file of this patent

UNITED STATES PATENTS 2,138,763     Graves               Nov. 29, 1938